United States Patent [19]
Spencer

[11] 3,853,255
[45] Dec. 10, 1974

[54] MOTORCYCLE CARRIER

[76] Inventor: Jimmy J. Spencer, 348 Clearfield Ave., Chesapeake, Va. 23320

[22] Filed: Aug. 1, 1973

[21] Appl. No.: 384,404

[52] U.S. Cl.......... 224/42.03 B, 224/42.06, 280/292
[51] Int. Cl. ............................................. B60r 9/06
[58] Field of Search... 224/42.03 B, 42.03 A, 42.06, 224/42.07, 42.18, 42.21; 280/292

[56] References Cited
UNITED STATES PATENTS

| 1,906,920 | 5/1933 | Sheffer | 224/42.07 |
| 3,176,903 | 4/1965 | Farley | 224/42.03 B |
| 3,348,713 | 10/1967 | Will | 224/42.03 B |
| 3,428,332 | 2/1969 | McCance | 224/42.03 B |
| 3,464,608 | 9/1969 | Rodriguez | 224/42.03 B |
| 3,504,831 | 4/1970 | Highnote | 224/42.03 B |

FOREIGN PATENTS OR APPLICATIONS

| 93,243 | 11/1938 | Sweden | 224/42.03 B |

Primary Examiner—Robert J. Spar
Assistant Examiner—Kenneth Noland
Attorney, Agent, or Firm—William E. Fears

[57] ABSTRACT

The present invention relates to a motorcycle carrier in which arc-shaped wheel recesses are detachably secured to a main horizontal support member, said arc-shaped wheel recesses adapted to hold the wheels of a motorcycle, wherein the main support member is easily attached to or detached from a standard rectangular trailer hitch by a connecting pin.

2 Claims, 4 Drawing Figures

3,853,255

3,853,255

MOTORCYCLE CARRIER

BACKGROUND OF THE INVENTION

Prior to this novel invention there have been various devices for carrying motorcycles, bicycles and the like on the rear ends of automobiles, trucks and the like, by use of various bumper attached carriers, but none adapted for carrying substantially heavy type motorcycles, and none capable of quick and easy attachment and detachment of the carrier to and from the automobile.

The present invention relates to carriers of transporting heavy motorcycles free of the cycle contact with the ground, safely and securely on the rear end of an automobile, truck, camper and the like, which carrier is easily attached and detached from a standard frame secured fixed trailer hitch on said automobile and the like.

SUMMARY OF THE INVENTION

The present invention includes two recessed inverted arc-shaped wheel carriers, reenforced by carrier supports, adapted to be detachably affixed to a main horizontal support member by attachment brackets and attachment bolts so fitted that a spacer means predetermines the width the wheel carriers are separated along the main support member to received the wheels of motorcycles of various lengths, said main support member being integrally affixed to a fixed sleeve connecting bar smaller than a fixed sleeve trailer hitch, which is adapted with connecting holes for attachment to a fixed sleeve permanent trailer hitch affixed to the frame of an automobile, truck or the like, by telescoping the connecting bar and the sleeve hitch together by a suitable connecting pin or bolt.

The primary object of the invention is to provide a carrier for substantially heavy motorcycles to permit the motorcycle to be carried on the rear-end of an automobile, truck or the like.

It is another object to provide a new and improved motorcycle carrying device wherein the transported cycle is completely suspended above the road surface by this novel suspension carrier.

A further object of the invention is to provide a new and improved transporting device for carrying heavy motorcycles which can be mounted and attached to a conventional telescoping type trailer hitch attachment.

DESCRIPTION OF THE PREFERRED EMBODIMENT

Figure 1:
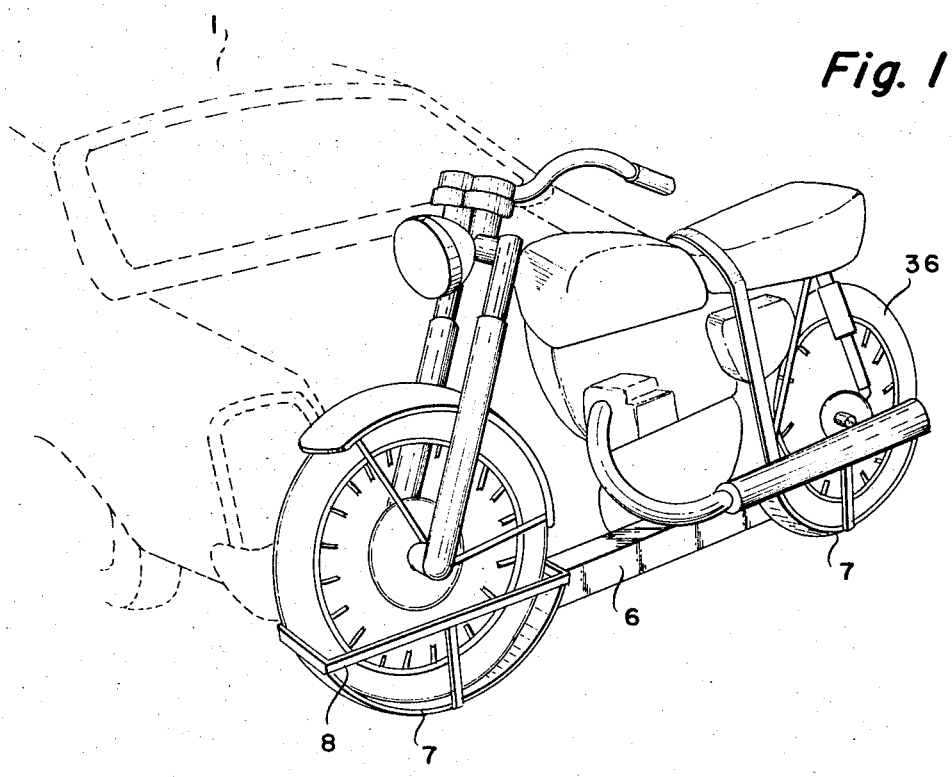
FIG. 1 is a perspective view of the invention affixed to the permanent trailer hitch of an automobile with a motorcycle in transportable position.
Figure 2:
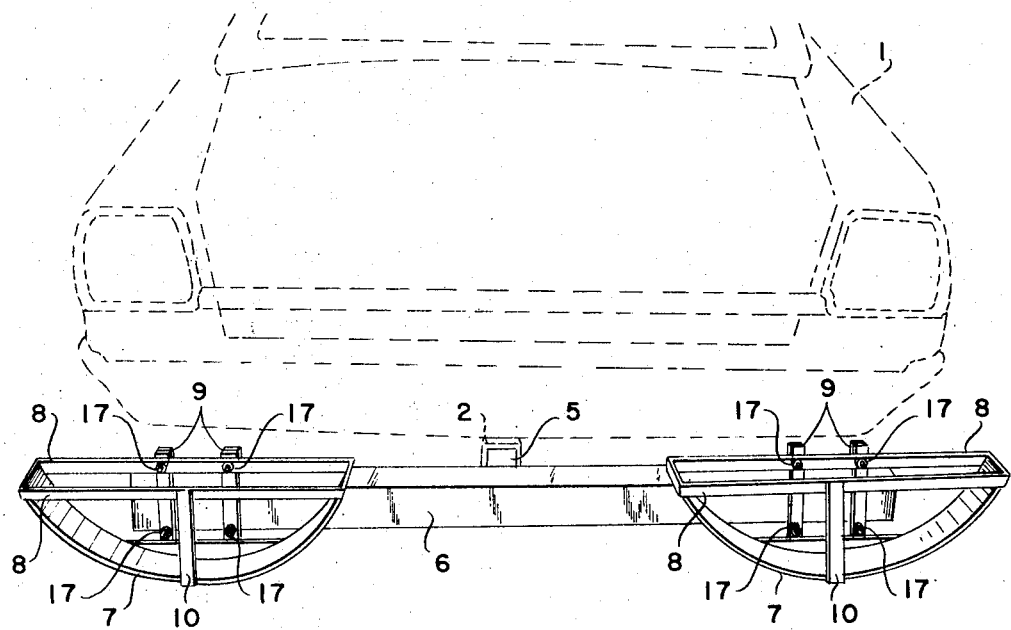
FIG. 2 is a perspective view of the invention showing its attachment to the permanent trailer hitch on the rear of an automobile.
Figure 3:
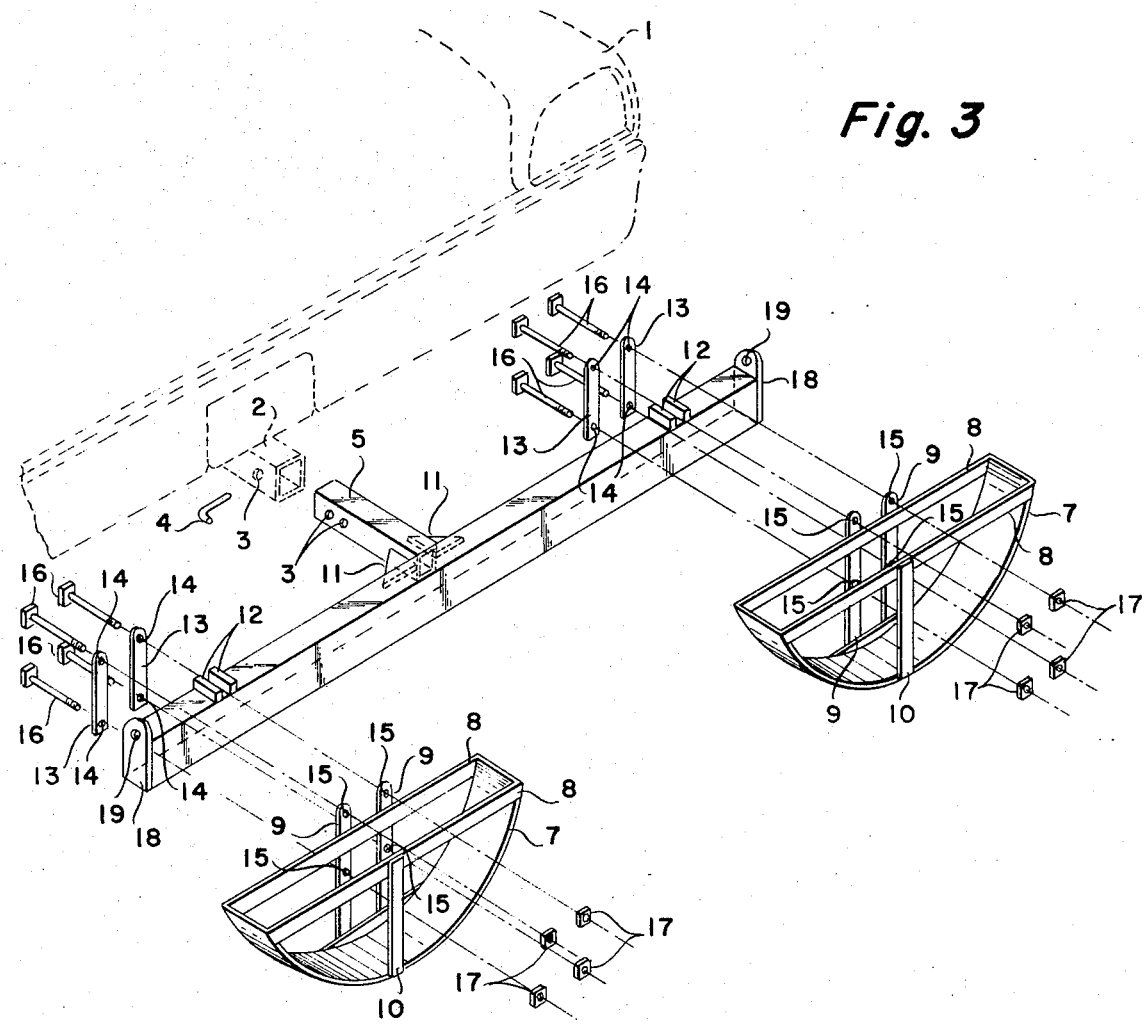
FIG. 3 is a perspective parts view of the disassembled inventive device.
Figure 4:
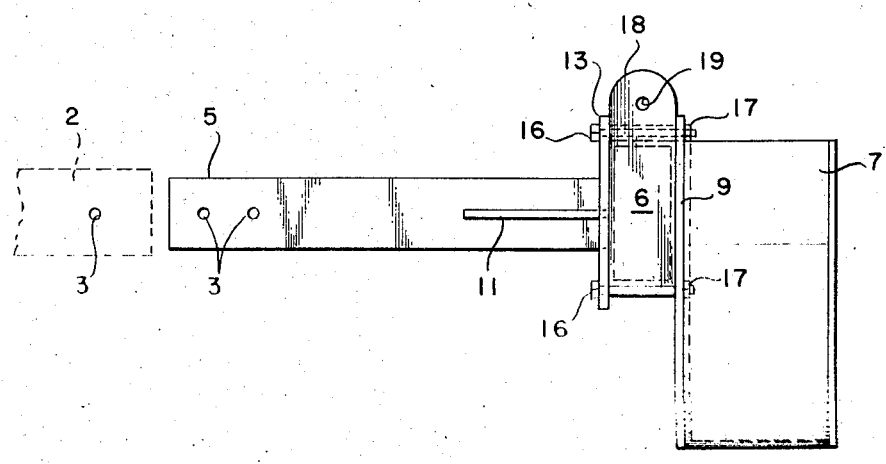
FIG. 4 is an end view of the main structural support member assembled with inverted arc-shaped carrier wheel wells bolted in carrier position.

Referring now to the drawings in detail wherein like reference characters indicate like parts throughout the several figures, the reference numeral 1 represents an automobile with a standard rectangular fixed sleeve trailer hitch 2 permanently affixed to the frame (not shown) of the automobile to distribute the heavy weight of a heavy motorcycle throughout the rear frame of an automobile, truck (not shown) and the like. This trailer hitch 2 is well known in the prior art. Hitch 2 has a keeper pin hole 3 therein for insertion of keeper pin 4 to retain the assembled carrier in position. Rectangular-shaped connecting bar mounting sleeve 5 is relatively smaller than hitch 2 so that they may telescoped together and connecting holes 3 are aligned for insertion of pin 4. Bar mounting sleeve 5 is integrally affixed to rectangular shaped main structural support member 6 by welded plat triangular braces 11, all being welded together. Main structural support member 6h as integral spacer bars 12 welded to the top at predetermined locations to locate bracket assembly bolts 16 in position. Inverted arc-shaped carrier wheel wells 7 are shaped to the contour of the motorcycle wheel being carried, and are formed by welding the rear vertical carrier supports 9 in position, and the front carrier support 10 in position to form a permanent wheel well as shown. Rear vertical carrier supports 9 are bolted with one bolt 15 through the spacers 12 through attachment bolt holes 15 for rear vertical carrier supports 9, and locked in position by bracket assembly nuts 17. The other bolts 16 are affixed to the other carrier support 9. Bolts 16 also pass over the top of the main structural support member 6 and pass through rear vertical connecting bracket holes 14 to affix rear vertical connecting brackets 13 in place on the rear of the main support member 6 to hold the entire assembly in place. The ends of main support member 6 are covered with structural L-shaped support member protective plates 18 by welds to protect the user from injury on the rough ends of support member 6, and coincidentally, to provide protective plate tie down holes 19 for insertion of suitable rope (not shown) or the like to tie down and secure the motorcycle 36 being carried thereon.

All parts of this device may be fabricated from any rigid metal or plastic. The material used isn't considered novel.

Having thus described the preferred embodiment of the invention, it should be understood that numerous structural modifications and adaptations may be resorted to without departing from the spirit of the invention.

What is claimed is:

1. A motorcycle carrier adapted to be detachably mounted to a trailer hitch affixed to the frame of an automobile or a truck and comprising a rectangular shaped connecting bar mounting sleeve, adapted for telescoping into a fixed rectangular sleeve hitch by telescoping therein with connecting pin and pin holes for attachment, integrally affixed to a rectangular-shaped main structural support member having arc-shaped carrier wheel wells detachably mounted on said structural support member at predetermined positions to receive the wheels of a motorcycle, said wheel wells being mounted by front and rear vertical connecting brackets with bolts therethrough and said wheel wells being formed of arc-shaped wells reenforced with horizontal and vertical carrier supports for attaching the same to the main support member, with an L-shaped protective means on each end of the main support member.

2. A motorcycle carrier for transporting motorcycles and the like in an upright position across the rear of an automobile and the like comprising a rectangular shaped connecting bar mounting sleeve with connecting pin holes therein, adapted for telescoping into a fixed rectangular sleeve hitch with juxtaposed connecting holes and pin, integrally affixed to a rectangular-shaped main structural support member and reinforced by welded triangular support braces longitudinally affixed to the support member and connecting bar, at least two inverted arc-shaped carrier wheel wells having front and rear vertical carrier supports with bolt holes therein detachably mounted on said structural support member at predetermined position to receive the wheels of a motorcycle, spacer bars integrally affixed to the top side of said connecting bar for spacing the bolts mounting said wheel wells, said wheel wells being mounted on said structural support member by bolts passing through holes in rear vertical connecting brackets and holes aligned therewith in the rear carrier supports with at least one of said bolts passing between said spacer bars, and an L-shaped protective plate welded over each end of said structural support member with each protective plate having a tie-down hole therein.

* * * * *